(12) United States Patent
Yamada et al.

(10) Patent No.: US 7,153,010 B2
(45) Date of Patent: Dec. 26, 2006

(54) LAMP BODY FOR VEHICLE LIGHTING UNIT AND LIGHTING UNIT FOR VEHICLE

(75) Inventors: Teruhisa Yamada, Shizuoka (JP); Daisuke Mochizuki, Shizuoka (JP); Hidetaka Anma, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 76 days.

(21) Appl. No.: 10/984,232

(22) Filed: Nov. 9, 2004

(65) Prior Publication Data

US 2005/0117362 A1 Jun. 2, 2005

(30) Foreign Application Priority Data

Dec. 1, 2003 (JP) .......................... P.2003-401824

(51) Int. Cl.
*F21V 1/00* (2006.01)

(52) U.S. Cl. ...................... 362/509; 362/507; 362/520; 362/310

(58) Field of Classification Search ................ 362/509, 362/520, 310, 507
See application file for complete search history.

(56) References Cited

U.S. PATENT DOCUMENTS 6,464,374 B1   10/2002   Akiyama et al.
6,478,471 B1   11/2002   Ishida et al.
6,747,094 B1 *  6/2004   Kinoshita et al. ............. 525/88
6,875,812 B1 *  4/2005   Akiyama et al. ............. 525/98

FOREIGN PATENT DOCUMENTS

| JP | 11-273414 | 10/1999 |
| JP | 2000-294012 | 10/2000 |
| KR | 2002-0037283 | 5/2002 |

OTHER PUBLICATIONS

Examination report from Korean patent office and English translation.

* cited by examiner

*Primary Examiner*—Renee Luebke
*Assistant Examiner*—Zahra I. Bennett
(74) *Attorney, Agent, or Firm*—Fish & Richardson P.C.

(57) ABSTRACT

A lamp body for a vehicle lighting unit includes a PC/PTT alloy material in which 80 to 50% by weight of a polycarbonate resin (hereinafter referred to as a PC) and 20 to 50% by weight of a polytrimethylene terephthalate resin (hereinafter referred to as a PTT) are contained as principal components and 5 to 10% by weight of a filler is added with respect to the total weight of the PC and the PTT. The lamp body constituted by the PC/PTT alloy material can be thermally welded to a lens formed of the PC, and has a heat resistance, a chemical resistance and a bending rigidity which are almost identical to those of a lamp body formed of a polypropylene. Therefore, the lens and the lamp body can be bonded and integrated by a thermal welding method.

3 Claims, 5 Drawing Sheets

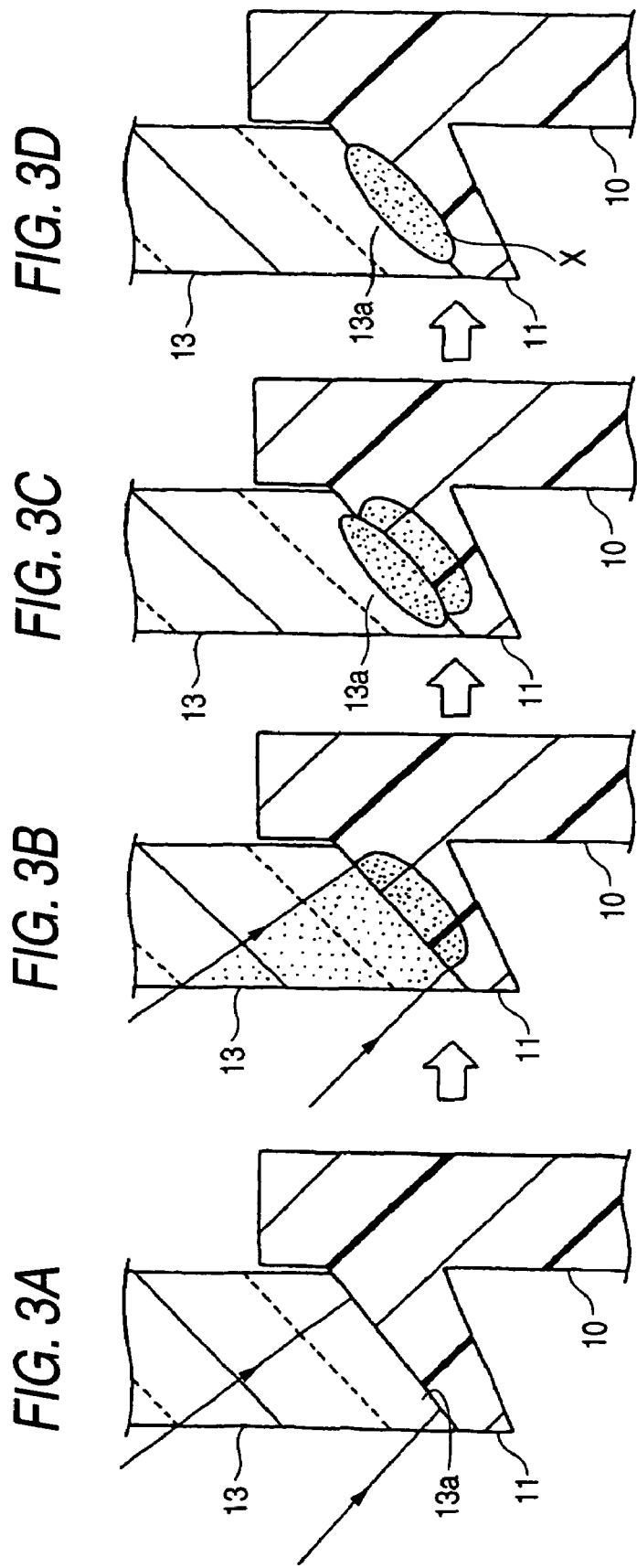

FIG. 4

| | COMPARATIVE EXAMPLE 1 | COMPARATIVE EXAMPLE 2 | EXAMPLE 1 |
|---|---|---|---|
| COMPOUNDING RATIO | PC/PBT ALLOY MATERIAL<br>PC: 70%<br>PBT: 30%<br>RUBBER: 4%<br>THERMOSTABILIZER: 0.4% | PC/PET ALLOY MATERIAL<br>PC: 70%<br>PET: 30%<br>RUBBER: 7%<br>THERMOSTABILIZER: 0.4% | PC/PTT ALLOY MATERIAL<br>PC: 70%<br>PTT: 30%<br>RUBBER: 4%<br>THERMOSTABILIZER: 0.4% |
| BENDING ELASTIC MODULUS (BENDING RIGIDITY) | 2064MPa | 2147MPa | 2119MPa |
| LOW LOAD DEFLECTION TEMPERATURE (130°C OR MORE) | 114°C | 137°C | 137°C |
| GASOLINE RESISTANCE (1100 SECONDS OR MORE) | 1128 SECONDS | 65 SECONDS | 3000 SECONDS |
| CPC RESISTANCE (3600 SECONDS OR MORE) | 3600 SECONDS | 66 SECONDS | 3600 SECONDS |
| ALCOHOL RESISTANCE (3600 SECONDS OR MORE) | 3600 SECONDS | 3600 SECONDS | 3600 SECONDS |
| WELDING PROPERTY TO PC (WHICH CAN BE CARRIED OUT AT 220°C) | YES AT 220°C | NO AT 220°C | YES AT 220°C |

FIG. 5

| | EXAMPLE 2 | EXAMPLE 3 | EXAMPLE 4 |
|---|---|---|---|
| COMPOUNDING RATIO | PC/PTT ALLOY MATERIAL<br>PC: 70%<br>PTT: 30%<br>FILLER: 5%<br>RUBBER: 4%<br>THERMOSTABILIZER: 0.4% | PC/PTT ALLOY MATERIAL<br>PC: 70%<br>PTT: 30%<br>FILLER: 10%<br>RUBBER: 4%<br>THERMOSTABILIZER: 0.4% | PC/PTT ALLOY MATERIAL<br>PC: 70%<br>PTT: 30%<br>FILLER: 10%<br>RUBBER: 4%<br>THERMOSTABILIZER: 0.4% |
| BENDING ELASTIC MODULUS (BENDING RIGIDITY) | 2510MPa | 3024MPa | 3081MPa |
| LOW LOAD DEFLECTION TEMPERATURE (130°C OR MORE) | 136°C | 138°C | 133°C |
| GASOLINE RESISTANCE (1100 SECONDS OR MORE) | 3600 SECONDS | 2548 SECONDS | 1659 SECONDS |
| CPC RESISTANCE (3600 SECONDS OR MORE) | 3600 SECONDS | 3600 SECONDS | 3600 SECONDS |
| ALCOHOL RESISTANCE (3600 SECONDS OR MORE) | 3600 SECONDS | 3600 SECONDS | 3600 SECONDS |
| WELDING PROPERTY TO PC (WHICH CAN BE CARRIED OUT AT 220°C) | YES AT 220°C | YES AT 220°C | YES AT 220°C |

LAMP BODY FOR VEHICLE LIGHTING UNIT AND LIGHTING UNIT FOR VEHICLE

TECHNICAL FIELD

The present invention relates to a lamp body for a vehicle lighting unit, and more particularly to a novel lamp body for a vehicle lighting unit which is formed of a resin alloy and can be thermally welded to a lens formed of a polycarbonate resin (hereinafter referred to as a PC).

BACKGROUND

Since a lens in a headlamp for an automobile requires transparence, great strength and heat resistance, it is generally formed of a PC. On the other hand, a lamp body in the headlamp generally has excellent heat resistance and chemical resistance and is formed of a tough and inexpensive polypropylene resin (hereinafter referred to as a PP).

Since the PP does not have a polarity, however, it has a poor adhesive property or welding property to other resin products (for example, a lens formed of the PC). For this reason, it is hard to bond or thermally weld the lamp body formed of the PP and the lens formed of the PC. Therefore, there has conventionally been employed, as a method of assembling and fixing both of them, a hot melt method of forming a seal groove capable of engaging a seal leg on a lens side with the peripheral edge portion of the opening portion of a front surface in a lamp body, inserting the seal leg in the seal groove loading a hot melt and fixing and holding an engaging portion between both of them through mechanical fastening means such as a clip, a concavo-convex lance engagement or a screw, thereby carrying out sealing.

SUMMARY

In the hot melt method, however, the seal groove is provided on the lamp body. For this reason, there is a problem in that the appearance of the seal groove is damaged, and particularly, the hot melt does not have a uniform thickness along the seal groove, resulting in insufficient waterproofing in the case in which the shape of the lamp body (the seal groove) is three-dimensionally complicated. For this reason, there has been desired the development of the new material of the lamp body which can be thermally welded to the lens formed of the PC in place of the PP.

Therefore, it was thought that the lamp body is preferably constituted by a crystalline polyester resin having a polarity in order to carry out the thermal welding to the lens formed of the PC, and thus three kinds of crystalline polyester resins were considered, including an alloy material (hereinafter referred to as a PC/PBT alloy material) of the PC and a polybutylene terephthalate resin (hereinafter referred to as a PBT), an alloy material (hereinafter referred to as a PC/PET alloy material) of the PC and a polyethylene terephthalate resin (hereinafter referred to as a PET), and an alloy material (hereinafter referred to as a PC/PTT alloy material) of the PC and a polytrimethylene terephthalate resin (hereinafter referred to as a PTT).

As a result of experiments and considerations, it was confirmed that the PC/PTT alloy material provided the best welding property to the PC and a chemical resistance in the three kinds of crystalline polyester resins and has physical properties which are almost identical to those of the PP.

The invention provides a lamp body for a vehicle lighting unit which can be thermally welded to a lens formed of a PC and is formed by a new material in place of a PP, and a lighting unit for a vehicle which comprises the lamp body.

In order to so provide, a first aspect of the invention is directed to a lamp body for a vehicle lighting unit which is constituted by a resin alloy material (a PC/PTT alloy material) containing a PC and a PTT as principal components.

More specifically, as described in a second aspect of the invention, it is desirable that compounding ratios of the PC and the PTT in the resin alloy material (the PC/PTT alloy material) should be 80 to 50% by weight and 20 to 50% by weight, respectively, and furthermore, a filler should be added in 5 to 10% by weight to a total weight of the PC and the PTT.

The lamp body constituted by the PC/PTT alloy material can be thermally welded to a lens formed of the PC and has a heat resistance and a chemical resistance which are almost identical to those of a lamp body formed of a PP.

The compounding ratio of the PC constituting the PC/PTT alloy material influences the chemical resistance. If the compounding ratio of the PC is too high (is higher than 80% by weight), a crack is apt to be generated at a low load in a chemical resistance test and the chemical resistance is low. On the other hand, if the compounding ratio of the PC is too low (is lower than 50% by weight), heat melting is carried out with difficulty so that a welding property is deteriorated.

Moreover, the compounding ratio of the PTT constituting the PC/PTT alloy material influences the welding property to the PC. If the compounding ratio of the PTT is too high (is higher than 50% by weight), the melting temperature of the PC/PTT alloy material is too high and cannot be welded well to the lens formed of the PC. On the other hand, if the compounding ratio of the PTT is too low (is lower than 20% by weight), the chemical resistance is reduced so that a crack is generated in a welded portion and waterproofing in the welded portion can be troublesome.

Furthermore, a filler such as talc, mica or calcium carbonate is added to the PC/PTT alloy material. Consequently, the bending rigidity of the PC/PTT alloy material can be enhanced. If the weight of the filler to be added is greater than 10% by weight with respect to the total weight of the PC and the PTT, however, a bending elastic modulus can be enhanced and a shock resistance might be reduced remarkably. On the other hand, if the weight of the filler to be added is smaller than 5% by weight with respect to the total weight of the PC and the PTT, the bending elastic modulus is too small so that the durability of the lamp body might be deteriorated.

A third aspect of the invention is directed to a lighting unit for a vehicle comprising the lamp body according to the first aspect of the invention which is opened on a front surface side, and a front surface lens covering the opening portion of the front surface of the lamp body and constituted by a polycarbonate resin, wherein a butt portion of a peripheral edge portion of the opening portion of the front surface of the lamp body and a peripheral edge portion of the front surface lens are welded thermally.

The butt portion of the lamp body constituted by the PC/PTT alloy material and the front surface lens (for example, the lens formed of the PC) can easily be welded and integrated by a welding method such as hot plate welding, vibration (including ultrasonic vibration) welding or laser welding.

A fourth aspect of the invention is directed to the lighting unit for a vehicle according to the third aspect of the invention, wherein the butt portion is constituted by a flange portion provided circumferentially on an outside of the opening portion of the front surface of the lamp body and a tip portion of a seal leg provided circumferentially on the peripheral edge of the front surface lens, and the flange portion has such a structure as to be extended with a rearward inclination to an orthogonal direction to the seal leg and the butt portion is thermally welded by a laser welding method.

When a laser beam is irradiated on the butt portion of the flange portion and the tip portion of the seal leg and the butt portion is thus laser welded, the laser beam incident obliquely to the seal leg is irradiated almost perpendicularly onto the abutment surface of the tip portion of the seal leg in the flange portion. Therefore, most of the incident laser beam is converted to a heat energy.

According to the first aspect of the invention, the thermal welding method can be employed as a method of bonding and fixing the lens and the lamp body in place of the hot melt method. Therefore, the following advantages can be obtained.

It is possible to seal and fix the butt portion of both the seal leg on the lens side and the peripheral edge portion on the lamp body side easily and reliably by simply welding them thermally. Consequently, the step of assembling the lens and the lamp body can be simplified. Even if the shape of the lamp body is three-dimensionally complicated, particularly, the butt portion (bonding portion) between the lens and the lamp body can be sealed reliably. Therefore, the waterproofing is excellent.

Moreover, it is possible to omit all of mechanical fastening means such as a seal groove, a hot melt, a clip, a concavo-convex lance engagement and a screw which are indispensable to the conventional hot melt method. Correspondingly, the structure of the lighting unit can be simplified, and furthermore, the lighting unit can have a slender and more attractive appearance.

According to the second aspect of the invention, it is possible to maintain a heat resistance, a chemical resistance and a bending rigidity which are almost identical to those of the lamp body formed of the PP. Therefore, it is possible to provide a lighting unit having an excellent durability which is equal to that of a lighting unit including the lamp body formed of the PP.

According to the third aspect of the invention, it is possible to mainly carry out thermal welding to a lens formed of the PC which is widely used in a headlamp. Thus, it is possible to provide a lighting unit for a vehicle which is inexpensive and is excellent in a design.

According to the fourth aspect of the invention, the laser beam is incident almost perpendicularly onto the abutment surface of the tip portion of the seal leg in the flange portion. Consequently, an efficiency of a conversion to a heat energy is high and the thermal welding can be correspondingly carried out in a short time.

BRIEF DESCRIPTION OF THE DRAWINGS

FIGS. 3(a)–3(d) are views showing a laser welding process between a lens and the lamp body.

FIG. 4 is a table showing the compounding ratio and physical properties of a PC/PTT alloy material according to a first example of the invention as compared with those in first and second comparative examples.

FIG. 5 is a table showing the compounding ratio and physical properties of a PC/PTT alloy material according to each of second, third and fourth examples of the invention.

DETAILED DESCRIPTION

Next, an embodiment of the invention will be described with reference to the accompanying drawings showing examples of the invention.

Figure 1:
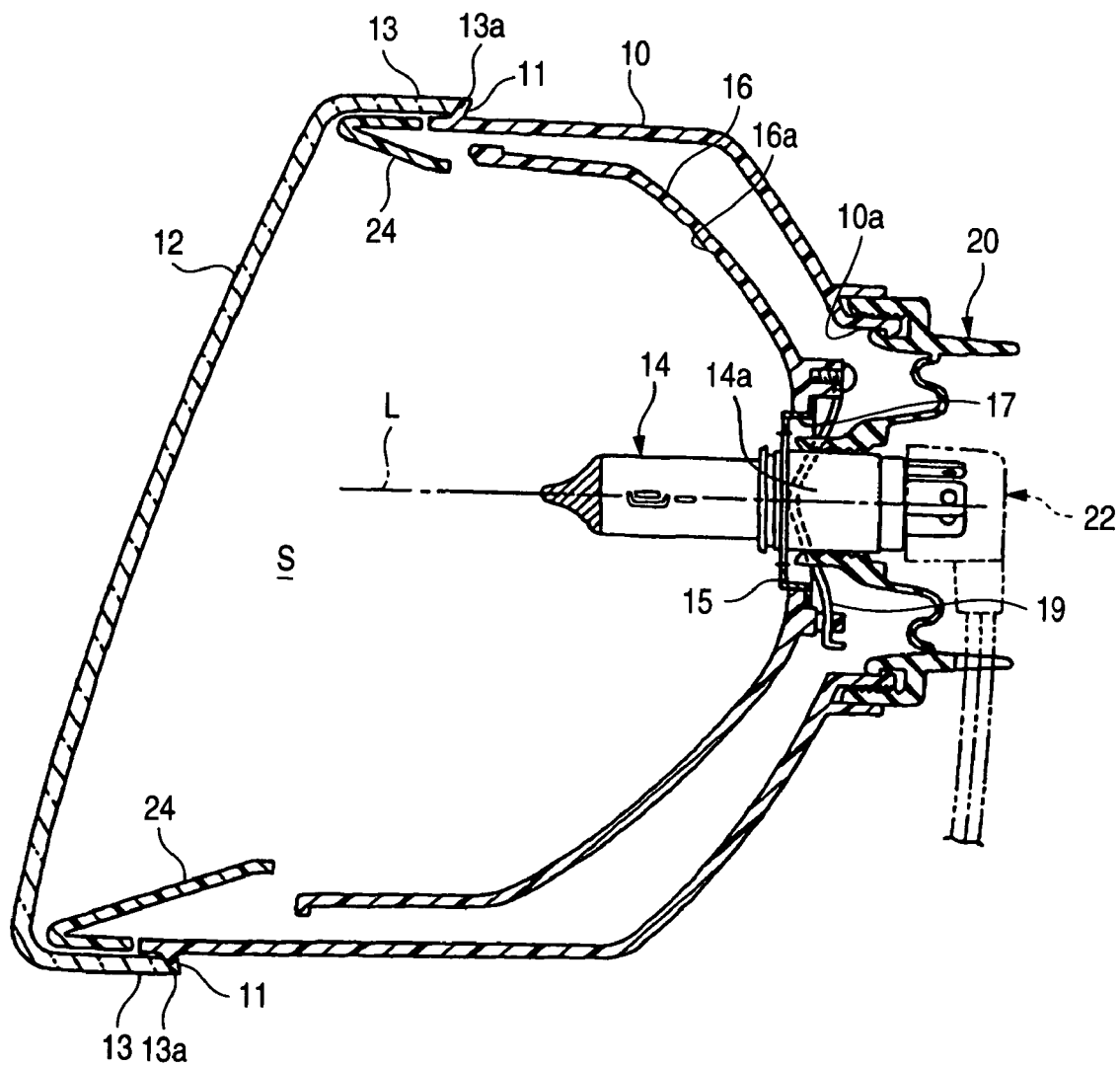
FIG. 1 is a longitudinal sectional view showing a headlamp for an automobile to which the invention is applied.
Figure 2:
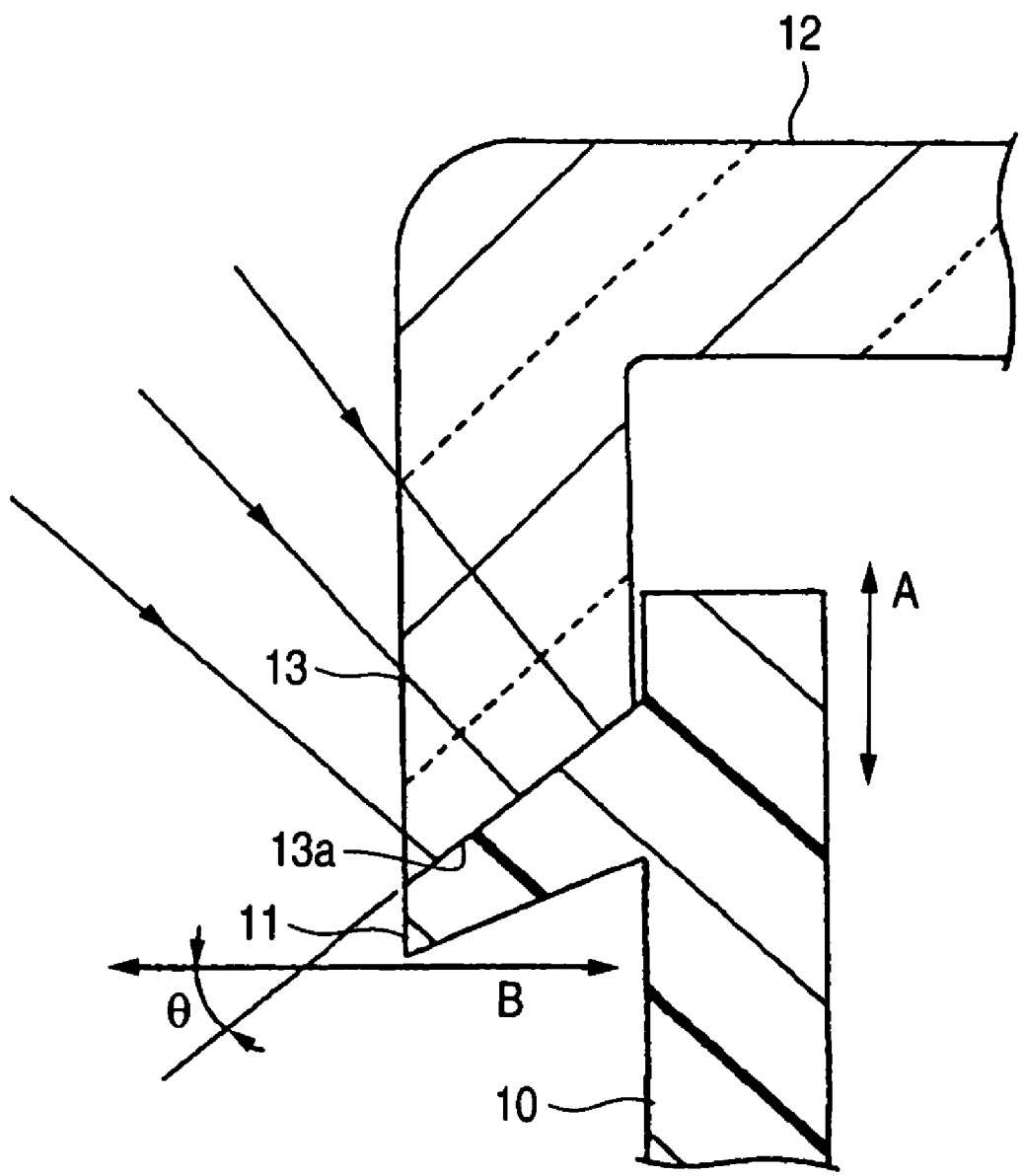
FIG. 2 is an enlarged sectional view showing the butt portion of a lens cover and a lamp body.

FIGS. 1 to 4 show a first example of the invention, FIG. 1 is a longitudinal sectional view showing a headlamp for an automobile to which the invention is applied, FIG. 2 is an enlarged sectional view showing a butt portion between a lens and a lamp body, FIG. 3 is a view showing a laser welding process between the lens and the lamp body, and FIG. 4 is a table showing the compounding ratio and physical properties of a PC/PTT alloy material according to a first example of the invention as compared with first and second comparative examples.

In FIG. 1, the reference numeral 10 denotes a vessel-shaped lamp body having a front surface opened. A flange portion 11 is provided circumferentially on the outside of the opening portion of the front surface in the lamp body 10. A seal leg 13 provided circumferentially on the peripheral edge of a lens cover 12 to be a front surface lens is thermally welded to the flange portion 11 so that the lens cover 12 is bonded and fixed to the lamp body 10. More specifically, the lens cover 12 is bonded and fixed to the opening portion of the front surface of the lamp body 10 in order to cover the same opening portion. Thus, a lamp housing S of the headlamp for an automobile is formed.

The reference numeral 16 denotes a reflector which integrally inserts and attaches an H4 bulb 14 to be a light source and is accommodated in the lamp housing S, and is constituted to tilt and adjust an optical axis L in vertical and transverse directions by means of an aiming mechanism which is not shown. The reference numeral 16a denotes an effective reflecting plane provided on the reflector 16. The reference numeral 15 denotes a focus ring provided integrally with a cap 14a of the bulb 14. The focus ring 15 is fixed and held to be engaged with a bulb inserting hole 17 of the reflector 16 by means of a wire spring 19 provided in the bulb inserting hole 17. The reference numeral 20 denotes a waterproof rubber cover which is interposed between an opening portion 10a for a bulb exchange of the lamp body 10 and the cap 14a of the bulb 14, and the reference numeral 22 denotes a connector for a feeding cord connection which is connected to the rear end of the cap 14a of the bulb 14. The reference numeral 24 denotes an extension reflector for hiding a clearance between the reflector 16 and the lamp body 10.

As described above, moreover, the lens cover 12 and the lamp body 10 which constitute the headlamp are sealed and fixed by welding and integrating the butt portion of (the seal leg 13 of) the lens cover 12 and (the flange portion 11 of) the lamp body 10 through a thermal welding method (see FIGS. 2 and 3) such as laser welding which has not been conventionally employed.

More specifically, the lens cover 12 is constituted by a clear PC material, while the lamp body 10 is constituted by a black PC/PTT alloy material which can be thermally welded to the PC material (a PC/PTT alloy material containing carbon black as a pigment). As shown in an enlarged view of FIG. 2, a laser beam (for example, a wavelength of 808 nm) for thermal welding is irradiated on the butt portion of the seal leg 13 and the flange portion 11 on the lamp body 10 side through the clear lens cover 12 so that the butt portion is welded thermally.

FIG. 3 shows a process for welding the butt portion of the seal leg 13 and the flange portion 11. First of all, as shown in FIGS. 2 and 3(a), when a laser beam is transmitted through the clear lens cover 12 constituted by the PC material (the seal leg 13) and reaches the interface of the butt portions 11 and 13a, the carbon black contained in the PC/PTT alloy material absorbs the laser beam in the flange portion 11 so that a surface layer part thereof generates heat. As shown in FIG. 3(c), then, the surface layer part of the flange portion 11 is molten and the heat in the molten part of the flange portion 11 is transmitted to the tip portion 13a of the seal leg 13. For this reason, as shown in FIG. 3(d), the tip portion 13a of the seal leg 13 is also molten so that the butt portions 11 and 13a are welded thermally. The designation X in FIG. 3(d) denotes a welded portion.

In an actual thermal welding process, a laser beam irradiating portion (not shown) provided in an upper leftward direction in FIG. 2 is caused to run in the circumferential direction of the opening portion of the front surface in the lamp body 10 in which the flange portion 11 is extended and is turned circumferentially to an original position while the laser beam is irradiated. Consequently, the butt portion of the flange portion 11 surrounding the opening portion of the front surface of the lamp body 10 and the tip portion 13a of the seal leg 13 can be sealed reliably and easily through the endless annular welded portion X.

In the example, moreover, the flange portion 11 provided circumferentially on the peripheral edge of the opening portion of the front surface in the lamp body 10 is extended to be inclined rearward at θ with respect to a direction B which is perpendicular to a direction A of the extension of the seal leg 13 as shown in FIG. 2, while the tip portion (end face) 13a of the seal leg 13 of the lens cover 12 is also constituted by an inclined surface conforming to the inclination θ of the flange portion 11 and has such a structure that the laser beam for thermal welding which is incident obliquely to the seal leg 13 is incident in an opposing direction to the interface between both of the butt portions 11 and 13a. Consequently, a welding efficiency is very high.

The PC/PTT alloy material constituting the lamp body 10 is constituted in such a compounding ratio that 70% by weight of a PC, 30% by weight of a PTT, 4% by weight of rubber to the total weight of the PC and the PTT, and 0.4% by weight of a thermostabilizer are added as shown in the example 1 of FIG. 4.

On the other hand, in a comparative example 1, a PC/PBT alloy material to be a crystalline polyester resin is constituted in such a compounding ratio that 70% by weight of a PC, 30% by weight of a PBT, 4% by weight of rubber to the total weight of the PC and the PBT, and 0.4% by weight of a thermostabilizer are added.

In a comparative example 2, moreover, a PC/PET alloy material to be a crystalline polyester resin is constituted in such a compounding ratio that 70% by weight of a PC, 30% by weight of a PET, 4% by weight of rubber to the total weight of the PC and the PET, and 0.4% by weight of a thermostabilizer are added.

For the physical properties of the PC/PTT alloy material, first of all, a bending elastic modulus is 2119 MPa which is smaller than the bending elastic modulus of a PP material used generally as the material of a conventional lamp body and is equal to or greater than that of each of the comparative examples 1 and 2.

Furthermore, the deflection temperature of the PC/PTT alloy material at a low load is 137° C. which is equal to or higher than that of each of the comparative examples 1 and 2, and is higher than a target value (130° C. or more) in the PP material, and a heat resistance is high.

In addition, a gasoline resistance is 3000 seconds or more which is more excellent than that of each of the comparative examples 1 and 2 and is much higher than a target value (1100 seconds or more) in the PP material. Thus, the gasoline resistance is high.

Moreover, a CPC resistance is 3600 seconds or more which is equal to or greater than that of each of the comparative examples 1 and 2 and is equal to a target value (3600 seconds or more) in the PP material.

Furthermore, an alcohol resistance has a value which is equal to a target value (3600 seconds or more) in the PP material and a value in each of the comparative examples 1 and 2. The alcohol resistance is almost equal to that in each of the PP material and the comparative examples 1 and 2.

Referring to a welding property to the PC material, moreover, welding can be carried out at 220° C. Consequently, the welding property to the PC material is excellent and the lens cover 12 formed of the PC and the lamp body 10 formed of the PC/PTT alloy can be welded to each other by a predetermined thermal welding method such as hot plate welding and vibration (including ultrasonic vibration) welding in addition to the laser welding shown in FIGS. 2 and 3. On the other hand, the welding to the PC material can be carried out at 220° C. in the comparative example 1 and cannot be carried out at 220° C. in the comparative example 2 and the PP material. Consequently, the welding property is poorer than that in the example 1.

FIG. 5 is a table showing the compounding ratio and physical properties of a PC/PTT alloy material according to each of second, third and fourth examples of the invention.

The PC/PTT alloy material constituting the lamp body 10 according to the second example is constituted in such a compounding ratio that 70% by weight of a PC, 30% by weight of a PTT, 4% by weight of rubber to the total weight of the PC and the PTT, 0.4% by weight of a thermostabilizer and 5% by weight of a filler (talc) are added.

For the physical properties of the PC/PTT alloy material according to the second example, first of all, a bending elastic modulus is 2510 MPa which is higher than the bending elastic modulus of the PC/PTT alloy material according to the first example, that is, 2119 MPa, and a bending rigidity is greater.

Moreover, a deflection temperature for a low load is 136□ which is higher than a target value of 130° C. or more in the PP material, and a heat resistance is high.

Furthermore, a gasoline resistance is 3600 seconds or more which is much higher than a target value in the PP material, that is, 1100 seconds or more. Thus, the gasoline resistance is high. In addition, both a CPC resistance and an alcohol resistance are 3600 seconds or more which is equal to a target value in the PP material. Thus, the CPC resistance and the alcohol resistance are almost equal to those in the PP material.

Moreover, welding to the PC material can be carried out at 220° C. Consequently, a welding property to the PC material is also excellent and the lens cover 12 formed of the PC and the lamp body 10 formed of the PC/PTT alloy can be welded to each other by a predetermined thermal welding method such as laser welding, hot plate welding and vibration (including ultrasonic vibration) welding.

Furthermore, the PC/PTT alloy material constituting the lamp body 10 according to the third example is constituted in such a compounding ratio that 70% by weight of a PC, 30% by weight of a PTT, 4% by weight of rubber to the total weight of the PC and the PTT, 0.4% by weight of a thermostabilizer and 10% by weight of a filler (talc) are added. In other words, the compounding ratio has a larger amount of the filler (talc) to be added than that in the second example.

For the physical properties of the PC/PTT alloy material according to the third example, first of all, a bending elastic modulus is 3024 MPa which is higher than the bending elastic modulus of the PC/PTT alloy material according to the second example, and a bending rigidity is much greater.

Furthermore, a deflection temperature for a low load is 138° C. which is higher than a target value of 130° C. or more in the PP material, and a heat resistance is high.

In addition, a gasoline resistance is 2548 seconds or more which is higher than a target value (1100 seconds or more) in the PP material. Thus, the gasoline resistance is high.

Moreover, both a CPC resistance and an alcohol resistance are 3600 seconds or more which is equal to a target value in the PP material. Thus, the CPC resistance and the alcohol resistance are almost equal to those in the PP material.

Furthermore, welding to the PC material can be carried out at 220° C. Consequently, a welding property to the PC material is also excellent and the lens cover 12 formed of the PC and the lamp body 10 formed of the PC/PTT alloy can be welded to each other by a predetermined thermal welding method such as laser welding, hot plate welding and vibration (including ultrasonic vibration) welding.

In addition, the PC/PTT alloy material constituting the lamp body 10 according to the fourth example is constituted in such a compounding ratio that 70% by weight of a PC, 30% by weight of a PTT, 0.4% by weight of a thermostabilizer to the total weight of the PC and the PTT, and 10% by weight of a filler (talc) are added. In other words, the example is different from the third example only in that rubber is not added.

For the physical properties of the PC/PTT alloy material according to the fourth example, first of all, a bending elastic modulus is 3081 MPa. The bending rigidity is the greatest in the examples.

Moreover, a deflection temperature for a low load is 133° C. which is lower than that in each of the first to third examples and is higher than a target value of 130° C. or more in the PP material, and a heat resistance is high.

Furthermore, a gasoline resistance is 1659 seconds or more which is the lowest in the examples and is higher than a target value (1100 seconds or more) in the PP material. Thus, the gasoline resistance is high.

In addition, both a CPC resistance and an alcohol resistance are 3600 seconds or more which is equal to a target value in the PP material. Thus, the CPC resistance and the alcohol resistance are almost equal to those in the PP material.

Moreover, welding to the PC material can be carried out at 220° C. Consequently, a welding property to the PC material is also excellent and the lens cover 12 formed of the PC and the lamp body 10 formed of the PC/PTT alloy can be welded to each other by a predetermined thermal welding method such as laser welding, hot plate welding and vibration (including ultrasonic vibration) welding.

While the talc has been used as the filler contained in the PC/PTT alloy material in the second, third and fourth examples, the talc is not restricted but mica or calcium carbonate may be used. In addition, the filler is not restricted to one type but at least two types of fillers such as the talc, the mica and the calcium carbonate may be used.

Furthermore, the filler is effective for enhancing the bending elastic modulus of the PC/PTT alloy material. By regulating the amount of the filler to be added, therefore, it is possible to cause the PC/PTT alloy material (the lamp body) to correspond to a bending elastic modulus which is required.

While the description has been given to the examples in which the invention is applied to the headlamp for an automobile, moreover, the invention can also be applied widely to a beacon light in which a lens formed of an acryl resin and a lamp body formed of a PC/PTT alloy are bonded and integrated by welding and other lighting units.

What is claimed is:

1. A lamp body for a vehicle lighting unit comprising a resin alloy material containing a polycarbonate resin and a polytrimethylene terephthalate resin as principal components, wherein the resin alloy material comprises 5 to 10% by weight of a filler with respect to a total weight of the polycarbonate resin and the polytrimethylene terephthalate resin in a compounding ratio of 80 to 50% by weight of the polycarbonate resin and 20 to 50% by weight of the polytrimethylene terephthalate resin.

2. A lighting unit for a vehicle comprising the lamp body according to claim 1 which is opened on a front surface side, and a front surface lens covering the opening portion of the front surface of the lamp body and containing a polycarbonate resin, wherein a butt portion of a peripheral edge portion of the opening portion of the front surface of the lamp body and a peripheral edge portion of the front surface lens are welded thermally.

3. The lighting unit for a vehicle according to claim 2, wherein the butt portion includes a flange portion provided circumferentially on an outside of the opening portion of the front surface of the lamp body and a tip portion of a seal leg provided circumferentially on the peripheral edge of the front surface lens, and the flange portion has such a structure as to be extended with a rearward inclination to an orthogonal direction to the seal leg and the butt portion is thermally welded by a laser welding method.

* * * * *